United States Patent [19]
Springle et al.

[11] 3,915,918
[45] Oct. 28, 1975

[54] PAINT COMPOSITION

[76] Inventors: William Robert Springle, 17 Highcross Way, Roehampton, London S.W.15; Douglas Frederick Rushman, Inglewood, 16 Eastgate, Hornsea, East Yorkshire, both of England

[22] Filed: Aug. 23, 1974

[21] Appl. No.: 500,104

[30] Foreign Application Priority Data
Aug. 24, 1973  United Kingdom............... 40305/73

[52] U.S. Cl................... 260/29.6 MN; 106/15 AF;
260/29.7 N; 260/45.9 R;
260/45.9 NP; 424/326
[51] Int. Cl.$^2$............................................ C09D 5/14
[58] Field of Search ....... 260/29.6 MN; 106/15 AF; 260/29.7 N; 260/45.9 R; 260/45.9 NP; 424/326

[56] References Cited
UNITED STATES PATENTS

| | | | |
|---|---|---|---|
| 3,142,615 | 7/1964 | Wehner | 424/326 |
| 3,383,408 | 5/1968 | Lies | 260/501.14 |
| 3,413,399 | 11/1968 | Wehner | 424/131 |

FOREIGN PATENTS OR APPLICATIONS

| | | |
|---|---|---|
| 1,493,069 | 7/1967 | France |

*Primary Examiner*—Eugene C. Rzucidlo
*Attorney, Agent, or Firm*—Molinare, Allegretti, Newitt & Witcoff

[57] ABSTRACT

This specification describes the preparation of paint compositions which have fungicidal and often algicidal properties. The paint compositions which can otherwise be conventional contain one of a range of substituted guanidine salts, the presently preferred salt being 2-guanidino - dodecane phosphate. The salt is preferably present in an amount of from 0.25 to 5% of the total weight of the paint composition.

12 Claims, No Drawings

PAINT COMPOSITION

This invention relates to paint compositions which term is to be construed herein as including paints, varnishes, lacquers or the like unless the context specifically requires otherwise. More especially the invention relates to paint compositions which have fungicidal and often algicidal properties so that fungal and often algal growth is inhibited on surfaces coated with the paint compositions.

BACKGROUND TO THE INVENTION

Mould growths occur on surfaces inside buildings particularly where dampness occurs, on the outside of buildings particularly in the tropics, and under special circumstances such as in breweries and bakeries where high temperature and high humidities are experienced.

Fungicides have been added to paint compositions to prevent or inhibit such mould growths but those which have proved highly effective have also been very toxic to man. This is highly undesirable particularly as the fungicide is effective because of slow leaching or release from the paint composition coating and so widescale use of these toxic fungicides is highly undesirable.

Very effective fungicides have proved to be organometallic and particularly organo-mercury compounds. Unfortunately they are also highly toxic to man and other animals. A number of organic fungicides have been tried in paints but while they have a low toxicity to man, they have not been highly active in paint composition coatings against a wide range of fungi.

It is therefore an object of this invention to provide paint compositions containing a fungicide which is highly effective against a wide range of commonly occuring fungi yet of low toxicity to man.

BRIEF DESCRIPTION OF THE INVENTION

According to the invention there is provided a paint composition which includes as a fungicide an effective amount, e.g. usually at least 0.20 or 0.25% by weight of the total paint composition, of a substituted guanidine salt having the general formula:

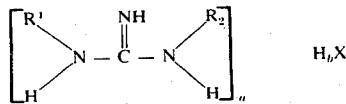

in which $R^1$ represents a primary or secondary alkyl group containing from 6 to 14 carbon atoms, $R^2$ represents a hydrogen atom or a 2-pyridyl group, $H_bX$ represents an inorganic or organic acid, and $a$ and $b$ are each 1, 2 or 3 the salt being capable of at least inhibiting the growth of at least the majority of the fungi which commonly grow on paint coatings, and the paint composition in the form of a paint coating being capable of slowly releasing sufficient of the fungicide from a paint coating at least to inhibit the growth of at least the majority of the fungi which commonly grow on paint coatings.

These substituted guanidine salts are found to be highly effective in preventing or inhibiting mould growths on coatings of the paint compositions of the invention for long periods of time yet they have a low toxicity to man. In addition many of these substituted guanidine salts are effective in preventing the growth of the more common terrestial algae on coatings of the paint compositions of the invention. This is a particularly surprising and useful advantage because it is often found that what were thought to be troublesome fungal mould growths on surfaces turn out to be algal growths.

There are many compounds which are known to have fungicidal properties, i.e. they either kill fungi or inhibit their growth, including some of the substituted guanidine salts referred to above. However, very few fungicidal compounds are effective against all or even most of the fungi commonly found in mould growths on surfaces in giving long lasting fungicidal paint composition coatings when incorporated into paint compositions. This is probably because relatively large amounts of the fungicide need to be incorporated in the paint compositions to give long fungicidal life and the fungicide must be released or leached slowly and progressively from the coating since if it is not released sufficiently fast it will never be present on the surface in a concentration sufficient to kill fungi and if it is released too quickly then the fungicidal life of the coating will be short. We have surprisingly found that particular combinations of a substituted guanidine salt and a paint composition give the resulting paint composition coatings excellent and long-lasting fungicidal properties.

The rate of release of the substituted guanidine salt from paint coatings according to the invention appears to depend both upon the paint composition and on the particular salt. The amount which must be released to prevent fungal growth also appears to be dependent upon the particular salt. Thus, for example, to kill all the common fungi which are likely to grow on paint coatings, a concentration of about 100 parts per million appears to be necessary on the surface of the coatings. However, there are some five fungi which are the most common as will be described in due course, and to prevent the growth of these a lower surface concentration may be possible. Thus in the case of 2-guanidino-dodecane phosphate it appears that this concentration can be as low as 30 parts per million, while for 1-guanidino-dodecane phosphate the minimum concentration appears to be about 90 parts per million.

It is possible to devise tests to determine whether a particular combination of substituted guanidino salt and paint composition will give paint composition coatings having good and lasting fungicidal properties. Thus to determine whether the rate of release of the salt from the coating is sufficiently fast to give an effective amount of the salt on its surface, the paint composition can, as will be described more fully later, be coated on a surface, dried and then contacted with an inoculum of fungal spores and incubated to see if fungal growth occurs, while to determine whether the rate of release of the salt from the coating is sufficiently slow to give long fungicidal life, a dried paint composition coating can, as will also be described more fully later, be leached with a water spray and then inoculated and the results observed, the duration of leaching before fungicidal properties are lost giving an indication of the likely fungicidal life of the paint composition coatings when in normal use.

The particular effective amount of the fungicidal to be added to paint compositions depend upon a number of factors including the type of paint, the so called "sieve characteristics" of the paint which can be modified to alter the rate of release of the salt, the particular salt and the required fungicidal life of the resulting paint composition coatings.

We have found, however, that concentrations of the salt of from 0.25 to 5% of the total weight of the paint composition generally appear to give excellent results.

Some substituted guanidine salts falling within the above general formula are more effective in killing or inhibiting the growth of the fungi commonly found on paint coatings than others and the more useful ones can be found by experiment, for example, as described later. It appears that the alkyl group represented by $R^1$ should preferably contain from 10 to 13 carbon atoms, the most preferred alkyl groups being the ones containing 12 carbon atoms. Salts which we have found to give good fungicidal results when incorporated in paints are the 1- and 2-guanidino-dodecane and 1-guanidino-decane salts, when prepared both from pure or commercially available starting materials, while suitable salts include phosphate, hydrochloride, carbonate, benzoate, gluconate, citrate, silicate, hydroiodide, succinate, acetate and phenylacetate salts. The phosphate salts appear to give particularly good results when incorporated into paint compositions, and in particular emulsion paints, and this could be because their rate of release from emulsion paint coatings is sufficiently rapid to give a relatively high concentration of the salt on the surface of the coating but is not too rapid for its effective life to be too short. The term "emulsion paint" is defined in BS2015 Glossary of Paint Terms.

Many of the substituted guanidine salts are known compounds and can be prepared, for example, as described in U.S. Pat. specification No. 3,383,408 while other salts can be prepared in similar ways or from the known salts. As generally prepared the salts will not necessarily be the pure salts but will be mixtures containing a range of alkyl substituents of varying carbon atom chain lengths, e.g. when they are prepared using as a starting material an Armeen L11 as sold by Armour Hess Chemicals Limited.

The paint compositions of the invention can be of all types for interior or exterior use. Examples include emulsion paints such as poly-vinyl acetate copolymer emulsion paints, acrylic emulsion paints and vinyl emulsion paints, and solvent based paints, e.g. air-drying oil paints such as alkyd paints, and varnishes. The paint compositions of the invention are generally for top-coat or single-coat application so that the fungicide is released onto the external paint composition surface. This is not essential, however, and the paint compositions of the invention can be for primer or undercoat purposes in certain circumstances to inhibit mould growth between the paint coatings and the painted surface.

The paint composition can be conventional and so include a binder or base which dries or cures when spread out as a film, pigment or extender to colour or opacify the film and other conventional ingredients such as driers, accelerators which are well known in the art.

Not all of the substituted guanidine salts are compatible with each particular paint composition and so in any particular case the salt is chosen so as to be compatible with and not deleteriously affect the other properties of the particular paint composition.

We have found from experience in examining many examples of mould growth on paint, both inside and outside buildings, that there are 16 fungi which are most frequently found. These are:

* *Alternaria alternata* (syn.tenuis),
  *Aspergillus flavus*,
  *Aspergillus versicolor*,
* *Aureobasidium pullulans*,
* *Cladosporium herbarum*,
  *Curvularia geniculata*,
  *Dendryphiella salina*,
  *Fusarium oxysporum*,
* *Paecilomyces variotii*,
  *Penicillium expansum*,
  *Penicillium purpurogenum*,
  *Pestalotia macrotricha*,
  *Phoma violacea*,
  *Stachybotrys atra*,
* *Stemphylium dendriticum*, and
  *Trichoderma viride*, and those marked with an asterisk are particularly widespread and important.

Examples of the substituted guanidine salts were tested for their effectiveness against these fungi by dissolving the salt in Cellosolve (ethylene glycol monoethyl ether) and incorporating the salt into a Czapek-Dox agar medium at 100 ppm by weight. After hardening, the agar plate was inoculated with spore suspensions of the 16 fungi and incubated at 25°C for 7 days. The particular salts tested were found to give the total fungal kill shown in the following Table I, this fungal kill including all five of the particularly important and widespread fungi marked with an asterisk above. The particular salts used were not the pure compound but contained a range of alkyl group substituents of which the predominant one was the compound listed in Table I.

TABLE I

| NUMBER | SALT | FUNGAL KILL |
|---|---|---|
| 1 | 1- guanidino-dodecane phosphate | 13 |
| 2 | 1- guanidino-dodecane carbonate | 13 |
| 3 | 2- guanidino-dodecane citrate | 15 |
| 4 | 2- guanidino-dodecane succinate | 14 |
| 5 | 2- guanidino-dodecane phenylacetate | 16 |
| 6 | 2- guanidino-dodecane acetate | 15 |
| 7 | 2- guanidino-dodecane benzoate | 16 |
| 8 | 2- guanidino-dodecane gluconate | 15 |
| 9 | 2- guanidino-dodecane hydrochloride | 16 |
| 10 | 2- guanidino-dodecane phosphate | 16 |
| 11 | 2- guanidino-dodecane silicate | 15 |
| 12 | 1- ($N^1$ -2- pyridyl guanidino) - decane hydroiodide | 16 |

As can be seen therefore the substituted guanidine salts which are incorporated in paint compositions according to the invention are highly effective on their own against the fungi most widely found on painted surfaces.

It appears that the length of the alkyl chain represented by $R^1$ has some effect on the fungicidal properties of the resulting salt. To demonstrate this a number of 2-guanidine acetates of varying alkyl chain length were tested as described above and the resulting fungal kill for each salt is shown in Table II below. As can be seen from these results the optimum chain length for best results in killing or inhibiting fungal growth was about 12 carbon atoms.

TABLE II

| SALT | ALKYL CHAIN LENGTH | FUNGAL KILL |
|---|---|---|
| 2-guanidino-nonane acetate | $C_9$ | 2 |
| 2-guanidino-decane acetate | $C_{10}$ | 8 |
| 2-guanidino-undecane acetate | $C_{11}$ | 12 |
| 2-guanidino-dodecane acetate | $C_{12}$ | 15 |
| 2-guanidino-tetradecane acetate | $C_{14}$ | 2 |

A test was also made to discover the minimum effective concentration of various substituted guanidine salts against fungi. This was achieved by adding to an agar culture medium in steps of 10 p.p.m. from 10 to 100 p.p.m. The agar plates were inoculated with the fungal spores of the 16 cultures, noted above, incubated for 7 days and then examined. The results are given in the following Table III.

Solutions of the salts were prepared in Cellosolve and added to each of the emulsion paints in proportions of 0.5 and 1% by weight of the total paint composition. The resulting compositions were then brushed on to plaster coated glass boiling tubes and the coating allowed to dry for evaluation. Some coatings were tested

TABLE III

| FUNGUS | Critical Toxic Concentration (p.p.m.) | | |
|---|---|---|---|
| | 2-guanidino-dodecane-phosphate | 12-guanidino-dodecane acetate | 1-guanidino-dodecane phosphate |
| A. alternata | 10 | 20 | 30 |
| A. flavus | 40 | 30 | 90 |
| A. versicolor | 90 | 50 | >100 |
| A. pullulans | 10 | 20 | 30 |
| C. herbarum | 20 | 20 | 90 |
| C. geniculata | 30 | 40 | 80 |
| D. salina | 10 | 10 | 20 |
| F. oxysporum | 100 | >100 | >100 |
| P. variotii | 10 | 20 | 20 |
| P. expansum | 20 | 20 | >100 |
| P. purpurogenum | 20 | 20 | 90 |
| P. macrotricha | 90 | 60 | >100 |
| P. violacea | 20 | 20 | 20 |
| S. atra | 40 | 30 | 90 |
| S. dendriticum | 30 | 20 | 90 |
| T. viride | 30 | 30 | 40 |

These results on an agar plate are believed to be a reasonable approximation to the concentration which would be required on the surface of a coating of a paint composition of the invention since the agar plates used comprise about 95.5% water and it is believed that to be effective in killing fungi the substituted guanidino salts are present on the surface of paint composition coatings as the aqueous solution.

Examples of the substituted guanidine salts were tested for fungicidal action in the following paint compositions:

| pva copolymer emulsion paint | parts by weight: |
|---|---|
| Rutile titanium dioxide (Tioxide RCR, Tioxide International) | 342.0 |
| 4% sodium hexameta phosphate solution | 12.8 |
| 4% methyl cellulose solutioin (Celacol M 450, British Celanese Ltd.) | 85.2 |
| water | 256.0 |
| pva copolymer emulsion (Vinamul N 6815, Vinyl Products Ltd.) | 304.0 |
| | 1000.0 |

| acrylic emulsion paint | parts by weight |
|---|---|
| Rutile titanium dioxide (Tioxide RCR, Tioxide International) | 321.0 |
| 4% sodium hexameta phosphate solution | 12.0 |
| 4% methyl cellulose solution (Celacel M 450, British Celanese Limited) | 80.4 |
| water | 241.0 |
| acrylic emulsion (Primal AC 34, Lennig Chemicals Ltd.) | 345.6 |
| | 1000.0 |

| soya alkyd gloss paint | parts by weight |
|---|---|
| Rutile titanium dioxide (Tioxide RCR, Tioxide International) | 330.0 |
| Soya alkyd resin (Synolac 29W, Cray Valley Products) | 515.0 |
| white spirit | 136.0 |
| 6% cobalt naphthenate solution | 3.4 |
| 24% lead naphthenate solution | 8.6 |
| dipentene | 7.0 |
| | 1000.0 | unweathered, some after 72 hours leaching with a distilled water spray, and some after 100 hours artificial weathering according to British Standard BS 3900, F3 according to which the coatings were exposed in a slowly rotating drum to ultra violet light from a carbon arc and distilled water from atomizers.

The various coatings were then inoculated with a mixed fungal inoculum. For testing interior effectiveness of unweathered coatings and coatings leached for 72 hours the inoculum consisted of:

*Cladosporium herbarum,*
*Paecilomyces variotii,* and
*Stemphylium dendriticum,* since these three are the most commonly found fungi on interior paint surfaces, while for testing exterior effectiveness of artificially weathered coatings the inoculum consisted of:

*Alternaria alternata* (syn. tenuis),
*Aureobasidium pullulans,* and
*Cladosporium herbarum,* since these three are the most commonly found fungi on exterior paint surfaces.

The inoculated paint coatings were then incubated in a Paint Research Association fungal Test Cabinet at a temperature of 23°C and a relative humidity of 100% for 21 days. The Paint Research Association fungal Test Cabinet is described in Laboratory Test Methods for Biocidal Paints, C. E. Skinner, Biodeterioration of Materials Volume 2, 346 to 354.

The results are given in the following Tables IV and V for the pva copolymer emulsion paint and acrylic emulsion paint, respectively, the Tables also giving for comparison the results of emulsion paint coatings not containing a substituted guanidine salt.

TABLE IV

| Salt Number From Table 1 | Proportion of salt to paint (% by weight) | Mould growth on paint coating | | |
|---|---|---|---|---|
| | | unweathered | leached (72 h) | artificially weathered (100 h) |
| Control | 0 | heavy | heavy | heavy |
| 1 | 0.5 | none | moderate | heavy |
| 1 | 1.0 | none | moderate | heavy |
| 2 | 0.5 | none | moderate | heavy |
| 2 | 1.0 | none | slight | moderate |
| 9 | 0.5 | none | moderate | heavy |
| 9 | 1.0 | none | slight | heavy |
| 10 | 0.5 | none | slight | moderate |
| 10 | 1.0 | none | none | slight |

TABLE V

| Salt Number From Table 1 | Proportion of salt to paint (% by weight) | Mould growth on paint coating | | |
|---|---|---|---|---|
| | | unweathered | leached (72 h) | artificially weathered (100 h) |
| Control | 0 | heavy | heavy | heavy |
| 1 | 0.5 | none | moderate | moderate |
| 1 | 1.0 | none | slight | moderate |
| 2 | 0.5 | none | moderate | moderate |
| 2 | 1.0 | none | slight | moderate |
| 9 | 0.5 | slight | moderate | heavy |
| 9 | 1.0 | none | moderate | heavy |
| 10 | 0.5 | slight | moderate | heavy |
| 10 | 1.0 | none | slight | moderate |

As can be seen the emulsion paints according to the invention containing the substituted guanidine salts were effective in reducing and in some cases eliminating mould growth. As can be seen some salts were more effective after advanced ageing than others so were better for incorporation into paint compositions to be used outside. It will be seen that 2-guanidino-dodecane phosphate is particularly good under all conditions.

Solutions of the various salts numbered 1 to 12 in Table 1 in Cellosolve were separately added to samples of the soya alkyd paint to give 1 and 2% by weight of salt based on the total weight of the paint. The paint samples were brushed onto grit-blasted glass boiling tubes, the coatings dried and then subjected some to 100 hours and some to 200 hours artificial weathering according to British Standard BS 3900, F3. The various coatings were then inoculated with the exterior mixed inoculum as set out above and the inoculated paint coatings incubated as above in the fungal Test Cabinet for 21 days.

The amount of mould growth in each case was compared with a control paint coating containing no substituted guanidine salt and tested in the same way and it was found that the degree of mould growth was less than upon the control paint coating although mould growth was not entirely eliminated.

The samples of the pva copolymer emulsion paint on its own and containing the various amounts of substituted guanidine salts prepared as described above were also tested to determine algicidal properties.

The samples of emulsion paint were brushed onto mortar coated tubes which had been articially weathered according to British Standard BS 3900, F3. The coating were allowed to dry and then artificially weathered according to British Standard BS 3900, F3 for 250 hours.

The weathered coatings were then inoculated with a mixed inoculum of Pleurococcus sp. and Oscillatoria sp. (two widely found terrestrial algae) and the inoculated coatings incubated in the fungal Test Cabinet at 28°C and 100% relative humidity for 28 days.

The algal growth was as shown in the following Table VI

TABLE VI

| Salt Number from Table 1. | Proportion of Salt to paint (% by weight). | Algal growth on weathered paint coating. |
|---|---|---|
| Control | 0 | heavy |
| 1 | 1.0 | heavy |
| 1 | 2.0 | moderate |
| 2 | 1.0 | heavy |
| 2 | 2.0 | moderate |
| 9 | 1.0 | moderate |
| 9 | 2.0 | moderate |
| 10 | 1.0 | slight |
| 10 | 2.0 | none |

As can be seen the coatings containing a substituted guanidine salt markedly reduced the algal growth, 2-guanidino-dodecane phosphate giving particularly good results.

A number of commercially available emulsion paints were tested as described above in connection with pva copolymer emulsion paint and acrylic emulsion paint and in each case heavy fungal growth incubated in the fungal Test Cabinet for 21 days. When 1% by weight of the total paint of 2-guanidino-dodecane phosphate was added to each paint and the paint tested, the results obtained were as shown below in Table VII.

TABLE VII

| Emulsion paint | Manufacturer | Mould growth on paint coating (unweathered) |
|---|---|---|
| Magicote Brilliant White | Berger Paints | None |
| Bergermatt White | Berger Paints | None |
| Leymura Emulsion Paint | Leyland Paints | None |
| Sandtex Matt | Blue Circle Group | None |

Magicote Brilliant White — high quality thixotropic flat emulsion paint based on a polyvinyl acetate copolymer emulsion, and pigmented with rutile titanium dioxide and other pigments. Recommended for interior and exterior use.

Bergermatt White — flat emulsion paint based on an acrylic copolymer emulsion, heavily pigmented with titanium dioxide and other pigments. Recommended for interior use only.

Leymura Emulsion Paint — all purpose emulsion paint based on a polyvinyl acetate copolymer emulsion, and having a high rutile titanium dioxide content.

Sandtex Matt — fine textured water-based decorative finish based on a liquid synthetic resin and selected pigments to which are added mica and fine hard aggregate derived from granite. Recommended for interior and exterior use.

All of the above results were obtained under laboratory conditions. However, these conditions have been found in testing conventional paint coatings to give advanced ageing results comparable to the normal weathering results found when those conventional films are used under natural conditions.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What we claim is:

1. In a paint composition for protecting surfaces the improvement which comprises the addition of an effective amount of a fungicide which is at least one substituted guanidino salt of the formula:

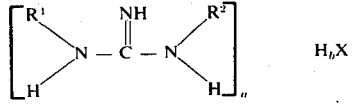

In which $R^1$ is chosen from primary and secondary alkyl groups containing 6 to 14 carbon atoms, $R^2$ is chosen from a hydrogen atom and a 2-pyridyl group, $H_bX$ is chosen from an inorganic and organic acid, and $a$ and $b$ are each integers from 1 to 3, said substituted guanidino salt being capable of at least inhibiting the growth of at least the majority of the fungi which commonly grow on paint coatings, and the paint composition in the form of a paint coating being capable of slowly releasing sufficient of the fungicide from a paint coating at least to inhibit the growth of at least the majority of the fungi which commonly grow on paint coatings.

2. The paint composition of claim 1, in which $R^1$ is chosen from primary and secondary alkyl groups containing 10 to 13 carbon atoms.

3. The paint composition of claim 1 in which $R^1$ is chosen from primary and secondary alkyl groups containing 12 carbon atoms.

4. The paint composition of claim 1 which contains at least 0.20% by weight of said substituted guanidino salt based on the total weight of said paint composition.

5. The paint composition of claim 4 in which said substituted guanidino salt is 2-guanidino-dodecane acetate.

6. The paint composition of claim 4 in which said substituted guanidine salt is 2-guanidino-dodecane benzoate.

7. The paint composition of claim 4 in which said substituted guanidine salt is 1-($N^1$-2-pyridyl guanidino)-decane hydroiodide.

8. The paint composition of claim 1 in which said substituted guanidine salt is the phosphate salt.

9. In a paint composition for protecting surfaces the improvement which comprises the addition of an effective amount of 2-guanidino-dodecane phosphate.

10. The paint composition of claim 9 which contains at least 0.20% by weight of said 2-guanidino-dodecane phosphate based on the total weight of said paint composition.

11. The paint composition of claim 10 which is an emulsion paint.

12. The paint composition of claim 1 which is an emulsion paint.

* * * * *